US011086756B2

(12) United States Patent
Narayanaswamy et al.

(10) Patent No.: US 11,086,756 B2
(45) Date of Patent: Aug. 10, 2021

(54) ELECTRONIC SERVICES USE-CASE TESTING FRAMEWORK

(71) Applicant: PAYPAL, INC., San Jose, CA (US)

(72) Inventors: Sivabalambikai Narayanaswamy, Cedar Park, TX (US); Saleem Shafi, Austin, TX (US)

(73) Assignee: PayPal, Inc., San Jose, CA (US)

( * ) Notice: Subject to any disclaimer, the term of this patent is extended or adjusted under 35 U.S.C. 154(b) by 2 days.

(21) Appl. No.: 16/222,304

(22) Filed: Dec. 17, 2018

(65) Prior Publication Data
US 2020/0192781 A1 Jun. 18, 2020

(51) Int. Cl.
*G06F 11/36* (2006.01)

(52) U.S. Cl.
CPC ...... *G06F 11/3612* (2013.01); *G06F 11/3664* (2013.01); *G06F 11/3684* (2013.01); *G06F 11/3688* (2013.01); *G06F 11/3692* (2013.01)

(58) Field of Classification Search
CPC ............ G06F 11/3664; G06F 11/3668; G06F 11/3672; G06F 11/3612; G06F 11/3684; G06F 11/3688; G06F 11/3692; H04L 67/02
See application file for complete search history.

(56) References Cited

U.S. PATENT DOCUMENTS

| 9,606,903 | B2 | 3/2017 | Murugesan | |
| 9,697,110 | B1* | 7/2017 | Arkadyev | G06F 11/3696 |
| 10,387,295 | B1* | 8/2019 | Kesarwani | G06F 11/3692 |
| 10,467,076 | B1* | 11/2019 | Kancharla | G06F 11/0745 |
| 2009/0006897 | A1* | 1/2009 | Sarsfield | G06F 11/3684 |
| | | | | 714/38.14 |
| 2017/0371772 | A1 | 12/2017 | Koplovich et al. | |

* cited by examiner

*Primary Examiner* — S. Sough
*Assistant Examiner* — Cheneca Smith
(74) *Attorney, Agent, or Firm* — Haynes and Boone, LLP

(57) ABSTRACT

Methods and systems are presented for providing a framework for testing electronic service use-case scenarios. The framework automatically generates test data and function calls with one or more backend services for testing different use-case scenarios of a feature. Upon receiving a scenario file, the framework identifies a feature and one or more use-case scenarios for testing the feature. Test data is dynamically generated based on the one or more use-case scenarios such that different test data is generated when the feature is tested multiple times. The framework then generates function calls for testing the feature based on the one or more use-case scenarios and executes the function calls on the one or more backend services. The responses received from the backend services are validated against expected responses indicated in the scenario file.

20 Claims, 6 Drawing Sheets

```
"/users/{user_id}/addresses": {
  "post": {
    "operationId": "createAddress",         ⟵ 502
    "description": "Create a new postal address.",
    "tags": [
      "addresses"
    ],
    "x-codegen-server-async": true,
    "x-codegen-server-servlet-request-context": true,
    "parameters": [
      {
        "in": "path",
        "description": "The id of the user.",
        "name": "user_id",
        "required": true,
        "type": "string"
      },
      {
        "in": "body",
        "name": "address",
        "description": "Address",
        "required": true,
        "schema": {
          "$ref": "create_address.json"
        }
      }
    ],
    "produces": [
      "application/json"
    ],
    "responses": {
      "200": {
        "description": "Address already exists",
        "schema": {
          "$ref": "created_address.json"
        }
```

Figure 5

ELECTRONIC SERVICES USE-CASE TESTING FRAMEWORK

BACKGROUND

The present specification generally relates to testing of electronic service use-case scenarios, and more specifically, to providing a framework for automatically generating use-case test data and function calls for testing various electronic service use-case scenarios according to various embodiments of the disclosure.

RELATED ART

It is common for an electronic service provider to test a new feature (e.g., a new electronic service) before releasing the feature in its online service platform (e.g., its website). Comprehensively testing a new feature is not a simple task as multiple (sometimes hundreds or even thousands) use-case scenarios may have to be tested in order to ensure that the new feature is bug-free (or substantially bug-free). For example, even a simple feature of enabling a user to add a new physical address to a user account of the electronic service provider requires testing of multiple use-case scenarios, such as adding an address that is within a character limit imposed by the online service platform, adding an address that it above the character limit, adding an address that includes data for all of the available fields, adding an empty address, adding an address that includes data for less than all of the available fields, etc. As the features offered by the electronic service provide grow in sophistication, the number and the complication of use-case scenarios for testing the features also increase.

To exacerbate the problem, the online service provider may change the technology (e.g., a backend service, a web service, etc.) that supports the features, and the features may have to be tested for both the old and new backend technologies as some of the features may transition over to the new technology while others are left behind. Thus, there is a need for providing a framework that assists software developers in testing new features of electronic services.

BRIEF DESCRIPTION OF THE FIGURES

FIG. 5 illustrates an example specification file according to an embodiment of the present disclosure.

Figure 1:
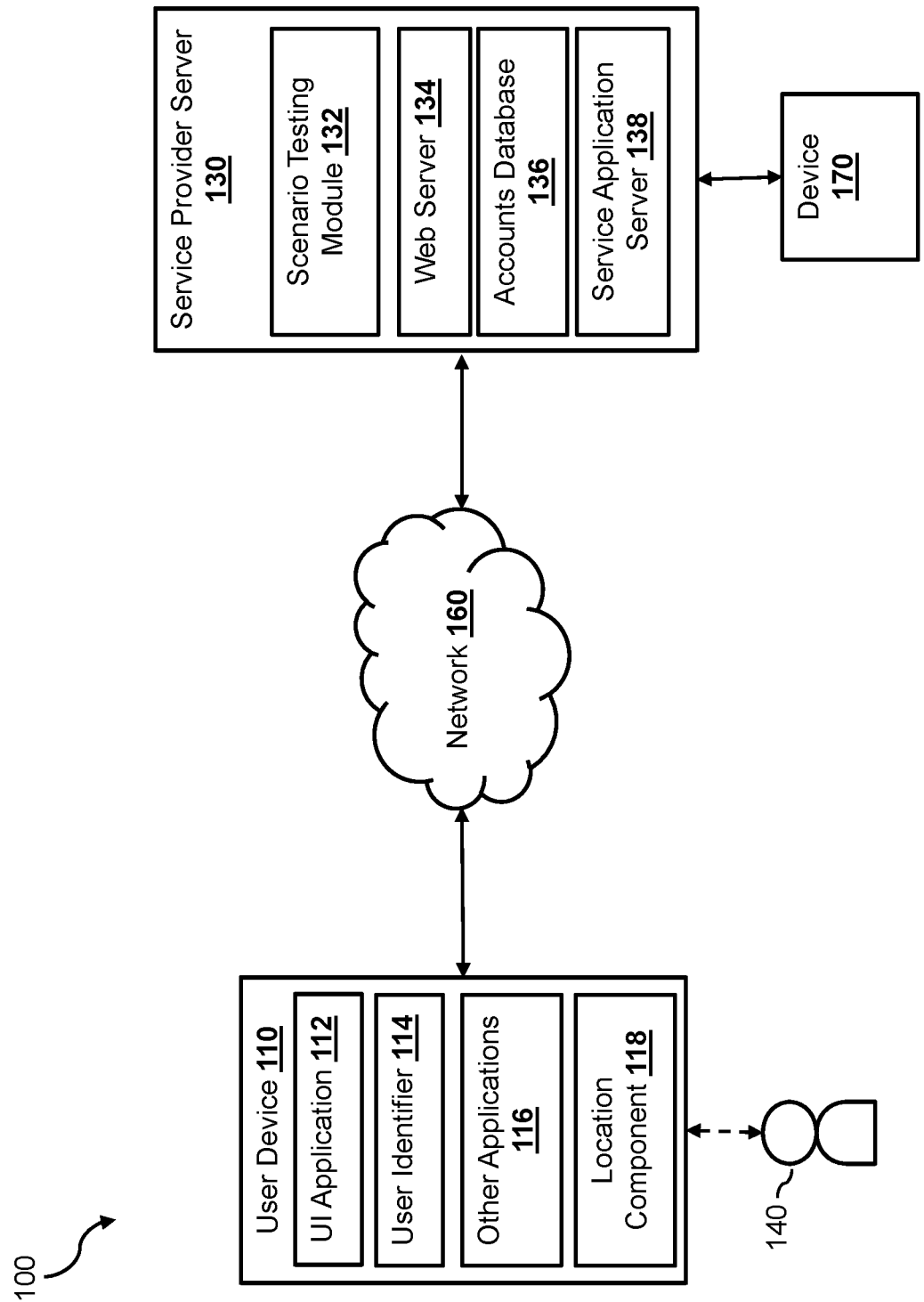
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a framework for testing electronic service use-case scenarios. As discussed above, testing new electronic service features can be a complicated task. Conventionally, software developers of an electronic service provider test different use-case scenarios associated with a feature by writing test programming code that make function calls specifically for a backend service (e.g., via an application program interface (API) provided by the backend service). As used herein, the term "backend service" means the backend infrastructure, including both hardware and software, for providing the feature (e.g., an electronic functionality) offered by an electronic service provider. In some embodiments, the backend service may be coupled with a frontend interface (e.g., a web interface) such that upon receiving an action from a user on the frontend interface (e.g., a user clicking on a button on the website), the frontend interface may generate and execute function calls with the backend service to perform the feature. Different backend services may include different hardware and software combinations. For example, different backend services may be implemented using different software languages (e.g., C++, Java, etc.) and/or may be implemented using different server systems (e.g., Microsoft® server, Linux® server, etc.). Thus, for implementing the backend functionalities of the same feature, different backend services may include different software code and/or different hardware architecture. When testing a feature, the software developer may bypass the frontend interface and directly generate and execute function calls with the backend interface to perform the feature.

For example, the software developer may generate test data for the different use-case scenarios and incorporate the test data in the function calls to initiate testing of the different use-case scenarios with the backend service. However, since the test data is incorporated into the function calls, it is difficult, even for software developers who can read and understand software code, to keep track of which use-case scenario is covered by which test data. Thus, some use-case scenarios may be duplicated in the software code while others may be missing from the software code. Furthermore, since the test data and function calls are tied to a specific backend service, a different set of software code may be required for testing with a different backend service, which poses challenges when the electronic service provider migrates from one backend service to another backend service. As such, during the migration of backend services or when different features use different backend services, multiple sets of test data and software code need to be developed and maintained.

According to some aspects of the disclosure, a framework (e.g., a scenario testing framework) is provided that automatically generates test data and function calls with one or more backend services for testing different use-case scenarios of a feature and that validates results from testing the use-case scenarios. As used herein, a "feature" may be defined as a self-contained functionality and/or an operation provided by a server of an electronic service provider. In some embodiments, the functionality and/or operation may reach an end state (e.g., successfully completed, error, etc.) after performing one or more actions associated with the feature. Example features may include creating a new account, adding a new physical address to an existing account, performing a transaction using an existing account, and any other operations offered by the electronic service provider.

In some embodiments, the framework separates the definitions of use-case scenarios from the test data and function calls associated with the use-case scenarios. For example, software developers may provide various scenario files that define different use-case scenarios. Each scenario file may specify a feature (e.g., an operation identifier) and one or more use-case scenarios for testing the feature. Advantageously, each of the scenario files are test data and backend service agnostic (e.g., a scenario file is not tied to specific test data and backend service). That is, each scenario file need not include test data and/or function calls that are specific to a backend service. As such, it is easier for the software developers as well as laypersons (e.g., a manager) to determine which use-case scenarios correspond to the scenario files by reading the scenario files than it is for them to read the software code. Furthermore, since the scenario files are backend service agnostic, the same scenario files can be used for testing with different backend services.

In some embodiments, the framework may include an interpreter configured to interpret the scenario files provided by the software developers. For example, the interpreter may parse a scenario file to determine a particular feature (e.g., based on the operation identifier included in the scenario file) and one or more use-case scenarios (e.g., based on one or more parameters included in the scenario file) for testing the particular feature. The framework may then generate fictitious test data for each one of the one or more use-case scenarios specified in the scenario file for testing the particular feature. In some embodiments, the framework may generate the fictitious test data based on a specification file associated with the feature. The specification file may include requirements for one or more data fields associated with the feature. Using an example feature corresponding to adding a new physical address for an account, the specification associated with that feature may indicate data fields associated with the feature, such as a first street address field, a second street address field, a city field, a state field, a zip code field, and a country field. Furthermore, the specification may include requirements for each of the data fields. For example, the specification may specify that each of the first and second street address fields may include alpha-numeric and special characters and may be limited to 20 characters, the city field may include alphabet characters and may be limited to 10 characters, the state field may include alphabet characters and may be limited to 10 characters, the zip code field may include alpha-numeric characters and may be limited to 8 characters, and the country field may include alphabet characters and may be limited to 10 characters.

In some embodiments, the framework may dynamically generate the fictitious test data based on both of the use-case scenario and the requirements associated with the data fields. For example, for a use-case scenario of adding a U.S. address that is within the character limits imposed by the online service platform, the framework may generate fictitious test data for each of the data fields that mimic a U.S. postal address, where the fictitious test data is generated to comply with the character limit requirement and other requirements specified in the specification. In one example, at least a portion of the fictitious test data (e.g., street address data, city data, etc.) may be randomly generated (e.g., randomly determining a number of characters for each field that complies with the requirement, and randomly generating a character for each of the characters in the data field) while another portion of the fictitious test data (e.g., the country field) is inserted based on the requirements imposed by the scenario. For another use-case scenario of adding an address that includes data for less than all of the available fields, the framework may determine (e.g., randomly selecting) one of the data fields to be left out and generate fictitious test data for all of the other data fields that comply with the requirements associated with the other data fields for the feature. By dynamically generating the test data, the framework provides different test data for testing the feature even when the same use-case scenario is being tested. Thus, based on an instruction to execute testing of the same use-case scenario of the feature multiple times (e.g., 50 times), the framework may automatically produce and execute multiple (e.g., 50) different sets of test data for testing the use-case scenario of the feature. This is especially advantageous in testing a feature as a higher chance that existing bugs may be discovered by testing the same feature using a variety of test data.

Once the fictitious test data is generated for the one or more use-case scenarios, the framework may generate function calls for testing the feature with one or more backend services. The framework may then execute the function calls for testing the one or more use-case scenarios. For example, the framework may test a first use-case scenario by incorporating a first set of fictitious test data in the function calls and executing the function calls. The framework may then test a second use-case scenario by incorporating a second set of fictitious test data in the function calls and executing the function calls. In some embodiments, when there are multiple backend services available for testing, the framework may generate multiple (e.g., different) sets of function calls, where each set of function calls corresponds to a different one of the backend services. The different sets of function calls may then be implemented within different coding framework specific to the corresponding backend services. In some embodiments, the framework may determine whether a particular backend service is specified in the scenario file by parsing the scenario file and may then generate the function calls corresponding to the particular backend service specified in the scenario file. In some embodiments, when multiple backend services are available for testing the feature, the framework may perform "mixed-mode" testing by implementing different function calls associated with the feature using codes specifically for the different backend services. For example, to test a feature of performing a transaction using a newly added address, the framework may implement a first function call corresponding to adding a new address based on codes specifically for a first backend service, and may implement a second function call corresponding to performing a transaction using the newly added address based on codes specifically for a second backend service. The framework may execute the first function call using the first backend service and may then execute the second function call using the second backend service for testing the feature.

In some embodiments, the specification file associated with the feature and/or the scenario file may also indicate valid responses (e.g., expected responses) from the backend services when the feature is performed. As such, the framework may parse the specification file and/or the scenario file to determine a valid response for each of the one or more use-case scenarios. As the framework receives a response from a backend service, based on executing the function calls with the backend service, the framework may validate the response by determining whether the response received from the backend service matches the valid response indicated in the specification file. The framework may then report the validation result to a user.

In some embodiments, the framework may also provide an intuitive interface for creating and/or editing a scenario file based on one or more specification files. As discussed herein, specification files associated with different features may be provided to the framework. Each specification file may be associated with a feature and may indicate the requirements for the data fields (e.g., for input data) associated with the feature. As such, the framework may parse the specification files to generate a list of features available (e.g., a list of operation identifiers indicated in the specification files) and a list of data fields that are associated with each feature. The interface that the framework provides for creating and/or editing a scenario file may include a text editor that enables a software developer to input text for a scenario file. As text is inserted into the text editor via the interface, the framework may detect whether the text matches one of the keywords associated with inserting an operation identifier or a data parameter. When a keyword associated with inserting an operation identifier is detected, the interface may present the list of operation identifiers obtained from the specification files as selectable options that enable the software developer to select any one of the operation identifiers to be inserted into the scenario file. When a keyword associated with inserting a data parameter is detected, based on the operation identifier indicated in the scenario file, the interface may present the list of data fields associated with the operation identifier as selectable options that enable the software developer to select any one of the data fields to be inserted into the scenario file.

In some embodiments, the interface may automatically fill-in keywords when a scenario file is being created and/or edited. For example, a scenario file may conform to a particular syntactical structure. The particular syntactical structure may require that certain words (e.g., keywords associated with the scenario files) would likely follow another type of data input. Thus, as text input is inserted into the scenario file via the text editor, the interface may detect that a particular word is inserted into the scenario file and may automatically insert another word into the scenario file based on the particular syntactical structure. The automatic listing of selectable operation identifiers and data fields, and the automatic fill-in of keywords enable software developers to generate scenario files without reading through the specification files.

FIG. 1 illustrates an electronic transaction system 100 within which the scenario testing framework may be implemented according to one embodiment of the disclosure. The electronic transaction system 100 includes a service provider server 130 associated with an electronic service provider and a user device 110 associated with an end-user (e.g., customer) 140 of the online service provider that may be communicatively coupled with each other via a network 160. The service provider server 130 may be communicatively coupled with a device 170 directly or via an internal network associated with the electronic service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by the end-user 140 to interact with the service provider server 130 and/or other user devices similar to the user device 110 over the network 160. For example, the end-user 140 may use the user device 110 to log in to a user account with the service provider to access account services or conduct electronic transactions (e.g., account transfers or payments, purchase goods and/or services, editing an account profile such as adding a physical address to the account, sales of goods and/or services, receive payments of the sale, adding a new financial source, etc.) with the service provider server 130. Furthermore, the end-user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the end-user 140 to conduct electronic transactions (e.g., selling, shopping, purchasing, electronic payments, etc.) with the service provider server 130 over the network 160. In one aspect, purchase expenses may be directly and/or automatically debited from the user account related to the end-user 140 via the user interface application 112. Similarly, sales receipts may be directly and/or automatically credited to the user account associated with the end-user 140.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the end-user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the end-user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the end-user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. For example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an electronic service provider, which may provide electronic services (e.g., selling of merchandise processing, purchasing of merchandise, performing electronic transactions, etc.). As such, the service provider server 130 may include a service application 138, which may be adapted to interact with the user device 110 over the network 160 to facilitate the electronic transactions such as searching, selection, purchase, payment of items online, and/or other electronic services offered by the service provider server 130. In one example, the service provider server 130 may be provided by PayPal®, Inc. of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may include a web server 134 configured to interact with a web browser of a user device (e.g., the user device 110) by serving web content to users in response to HTTP requests. As such, the web server 134 may include pre-generated web content ready to be served to users. For example, the web server 134 may store a log-in page and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130. In some embodiments, the web server 134, the service application server 138, and the account database 136 together form an online environment within which the online service provider offers online services to end-users.

Figure 2:
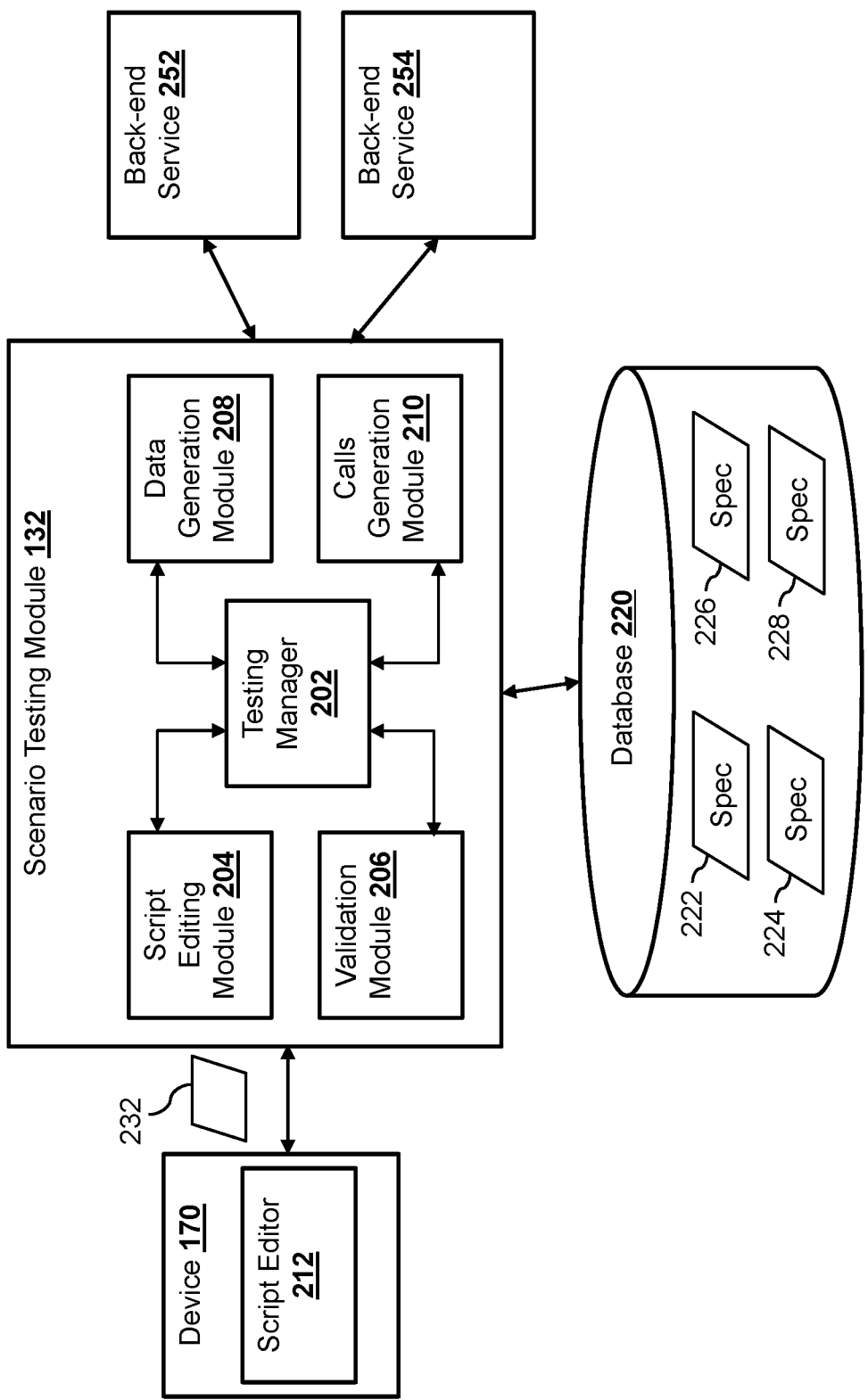
FIG. 2 is a block diagram illustrating a scenario testing module according to an embodiment of the present disclosure.

The service provider server 130 may also include a scenario testing module 132 that implements the functionalities of the use-case scenario testing framework as disclosed herein. In some embodiments, the scenario testing module 132 provides an interface on the device 170 for creating and/or editing a scenario file and an interface to initiate testing of a feature according to one or more use-case scenarios based on the created scenario file. FIG. 2 illustrates a block diagram of the scenario testing module 132. As shown in FIG. 2, the scenario testing module 132 includes a testing manager 202, a script editing module 204, a validation module 206, a data generation module 208, and a calls generation module 210. The script editing module 204 may work with a script editor (that may include a text editor) executed on the device 170 to provide an interface for creating and/or editing a scenario file. In some embodiments, the script editing module 204 may parse the specification files (e.g., specification files 222-228) stored in the database 220 to provide listings of the operation identifiers and the data fields and automatic fill-in of keywords when the scenario file is being edited on the device 170. Upon receiving an instruction to test a feature based on a scenario file, the testing manager may retrieve a specification file associated with the feature and use the data generation module 208 to generate fictitious test data that satisfies the use-case scenario indicated in the scenario file and the requirements indicated in the specification file. The testing manager may also use the calls generation module 210 to generate function calls for testing the feature with one or more backend services (e.g., backend services 252 and 254). The testing manager may then execute the function calls with the backend services 252 and 254 and use the validation module 206 to validate the response received from the backend services 252 and 254.

Figure 3:
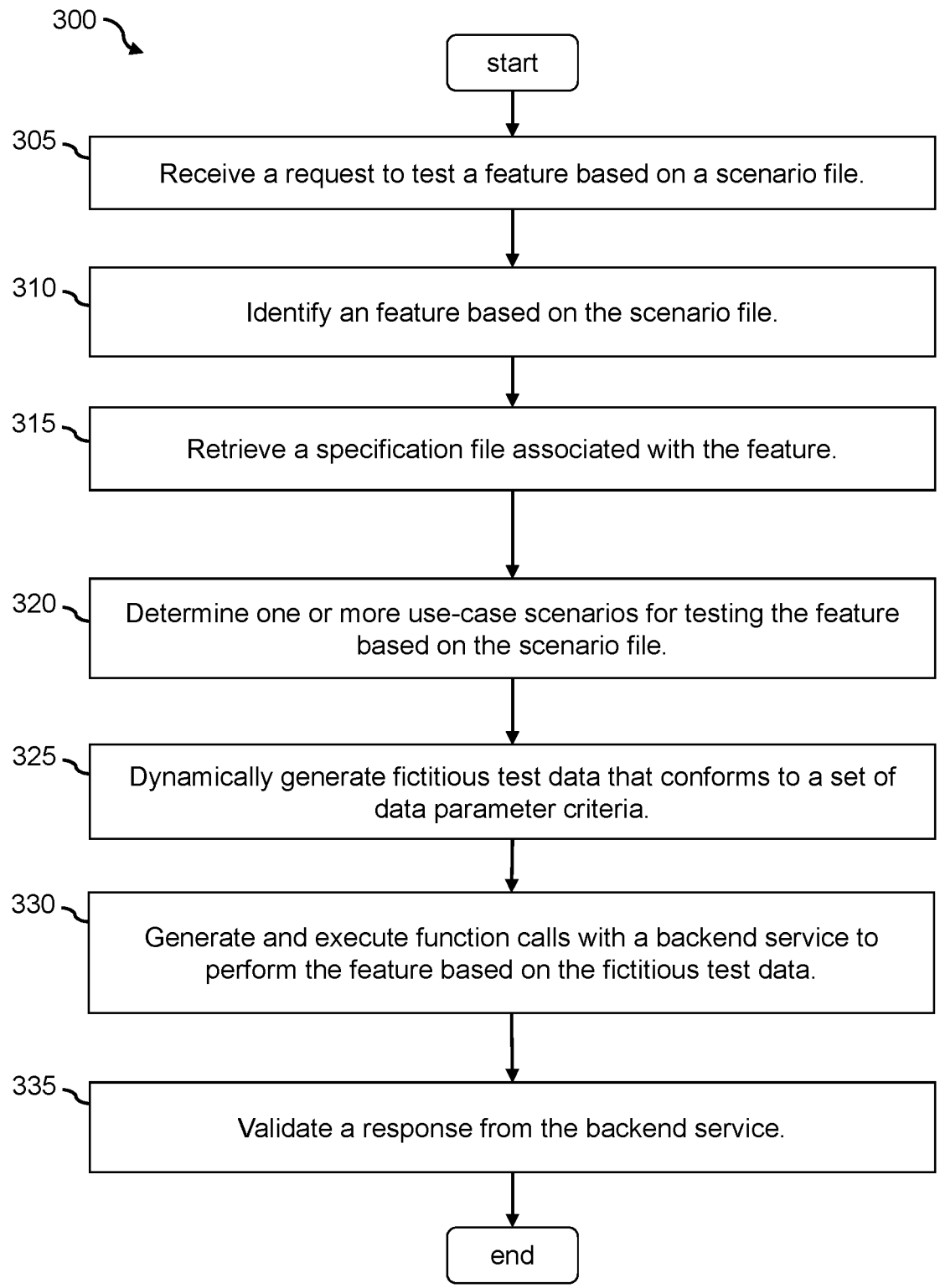
FIG. 3 is a flowchart showing a process of testing a feature based on different use-case scenarios according to an embodiment of the present disclosure.

FIG. 3 illustrates a process 300 for facilitating testing of use-case scenarios according to various embodiments of the disclosure. In some embodiments, the process 300 may be performed by the scenario testing module 132. The process 300 begins by receiving (at step 305) a request to test a use-case scenario. For example, the scenario testing module 132 may receive a request to test a feature based on a scenario file (e.g., a scenario file 232) from the device 170. In some embodiments, the scenario testing module 132 may provide an interface on the device 170 for initiating a request to test a use-case scenario. For example, the scenario testing module 132 may provide a command-line interface on the device 170 that enables a user (e.g., a software developer) to execute a command corresponding to performing a test of a framework. In another example, the scenario testing module 132 may provide a web interface presentable on a web browser of the device 170 to initiate the request. In some embodiments, the request may indicate a location of the scenario file 232 (e.g., a memory location on the device 170 or a location within the internal network of the electronic service provider, such as a memory location of the service provider server 130).

Figure 4:
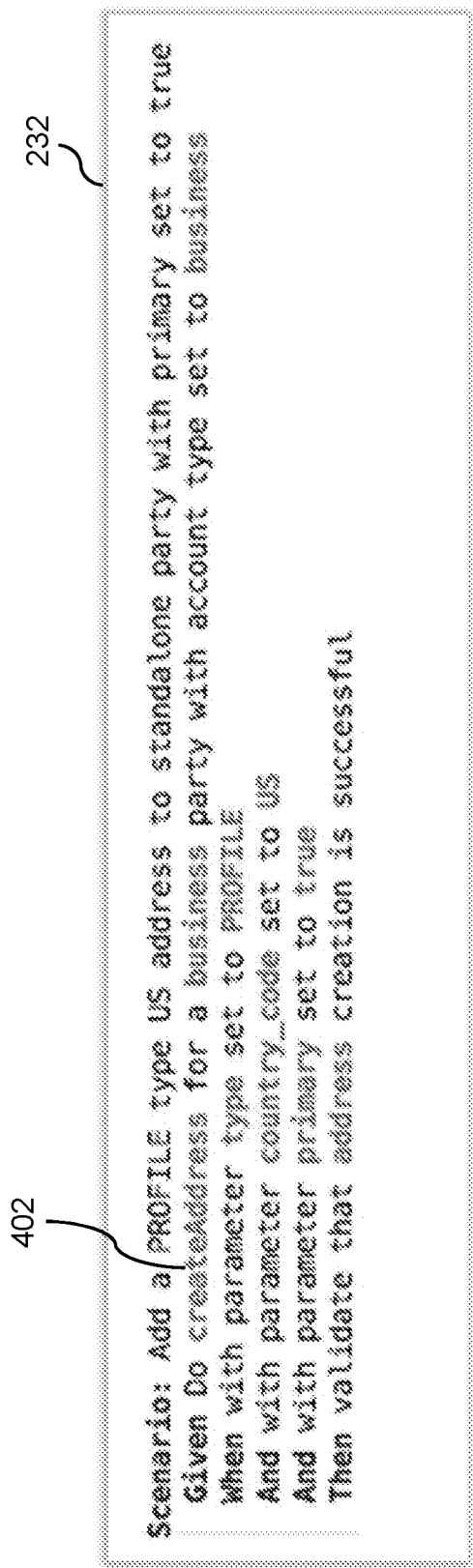
FIG. 4 illustrates an example scenario file according to an embodiment of the present disclosure.

Next, the process 300 identifies (at step 310) a feature based on the scenario file. For example, the testing manager 202 may retrieve the scenario file 232 based on the location indicated in the request. In some embodiments, the scenario testing module 132 may act as an interpreter by parsing and performing executions on one or more backend services based on the scenario file 232. For example, the testing manager 202 may parse the scenario file 232 to determine a feature and one or more use-case scenarios with which to test the feature. FIG. 4 illustrates example text that may be included in the scenario file 232. As illustrated in FIG. 4 and discussed herein, the text in the scenario file 232 may follow a particular syntactical structure. For example, the text in the scenario file 232 may include four phrases, where each phrase begins with a corresponding keyword. The first phrase (e.g., the first line) of the scenario file 232 begins with a keyword "Scenario" is followed by a colon. The text immediately after the keyword "Scenario" describes the one or more use-case scenarios covered by the scenario file 232 in plain language. In this example, the scenario that is covered by the scenario file 232 includes "add a profile type US address to standalone party with primary set to true." The description of the scenario in plain English allows anyone (e.g., software developers, managers, etc.) who reads the scenario file to be able to understand which scenario this scenario file 232 covers without requiring them to decipher software code.

The second phrase (e.g., the second line) of the scenario file 232 begins with another keyword "Given." The text immediately following the keyword "Given" specifies (1) a feature and (2) a setting (e.g., an account setting) of an account on which the feature (e.g., functionality) is operated. In this example, the scenario file 232 specifies that the feature is associated with creating a new physical address, as indicated by the operation identifier "createAddress" that follows immediately the keyword "Do." In addition, the scenario file specifies an account setting having a "business" party and a "business" account type, as indicated by the text that immediately follows the operation identifier.

The third phrase (e.g., that includes the next three lines) of the scenario file 232 begins with the keyword "When," and specifies the scenario covered by the scenario file 232 that is interpretable by the scenario testing module 132. In particular, as indicated by the next three lines of the scenario file 232 that follows the keyword "When," the scenario covered by the scenario file 232 requires that the new address being added to the business account has a type set to "PROFILE," a "country_code" set to "US," and a "primary" parameter set to "true."

The fourth phrase (e.g., the last line) of the scenario file 232 begins with the keyword "Then," and specifies how the response from testing the feature should be validated. In this example, as indicated by the text that follows the keyword "Then," the scenario file 232 specifies that after performing the feature, the creation of the address should be validated as successful. The particular syntactical structure in FIG. 4 is illustrated as one example syntactical structure that can be used for the scenario testing module 132, and other syntactical structures can be adopted and used by the scenario testing module 132 in other embodiments.

As such, the testing manager 202 may parse the second phrase of the scenario file 232 to determine that the feature covered by the scenario file 232 is a feature for adding a new physical address. The process 300 then retrieves (at step 315) a specification file associated with the feature. For example, based on the operation identifier "createAddress," the testing manager 202 may retrieve a specification file (e.g., the specification file 222) that is associated with the feature of adding a new physical address from the database 220. In some embodiments, each specification file in the database 220 may include an operation identifier for indicating the feature associated with the specification file. As such, the testing manager 202 may determine that the specification file 222 corresponds to the feature for adding a new physical address by matching the operation identifier indicated in the scenario file 232 with the operation identifier included in the specification file 222.

FIG. 5 illustrates a portion of example text included in the specification file 222. As shown in FIG. 5, the third line of the specification file 222 indicates the operation identifier associated with the specification file 222 to be "createAddress," which matches the operation identifier 402 indicated in the scenario file 232. The process 300 then determines (at step 320) one or more use-case scenarios for testing the feature based on the scenario file and dynamically generates (e.g., at step 325) fictitious test data that conforms to a set of data parameter criteria. For example, the testing manager 202 may parse the third phrase of the scenario file 232 to determine that the scenario covered by the scenario file 232 includes adding a physical address having an address type set to "PROFILE," a "country_code" set to "US," and a "primary" parameter set to "true."

The testing manager 202 may then use the data generation module 208 to generate fictitious test data for testing the scenario covered by the scenario file 232. In some embodiments, the data generation module 208 may generate the fictitious test data for the scenario based on both the scenario file 232 and the specification file 222. For example, when the testing manager 202 parses the second phrase of the scenario file 232 to identify the feature associated with the scenario file 232, the testing manager 202 may determine that the feature (or operation) of adding a new physical address is performed on an existing business type account. As such, the testing manager 202 may use the data generation module 208 to generate data for creating a new business type account. For example, the data generation module 208 may generate a fictitious business name, a fictitious business address, etc. and other data necessary to create the business type account. As discussed above, in some embodiments, the data generation module 208 may generate the fictitious data that complies with the requirements set forth in the specification file (e.g., the specification file 222). For example, when the specification file 222 requires that the business name field to be limited to 10 characters, the data generation module 208 may randomly generate a fictitious business name having 10 or less characters. In some embodiments, however, the data generation module 208 may deliberately generate fictitious data that fails the requirements set forth in the specification file 222 in order to test how the backend service(s) handle situations when the input data does not comply with the requirements. For example, the data generation module 208 may deliberately generate a business name having more than 10 characters. The testing manager 202 may then create a business account using the generated data. In one example, the testing manager 202 may create the business account in the live environment (e.g., adding the business account in the accounts database 136 of the service provider server). In another example, a staging environment (e.g., an offline environment) may be provided to the scenario testing module 132 for testing features, and the testing manager 202 may add the business account to the staging environment. Upon creating a new business type account, the testing manager 202 may obtain an account identifier associated with the newly created account. In some embodiments, based on a single scenario specified in the scenario file 232, the scenario testing module 132 may automatically test the same feature specified in the scenario file 232 multiple times, each time with a different set of fictitious data. As such, data generation module 208 may automatically generate multiple sets of data for testing the feature multiple times. In some embodiments, when the data generation module 208 is configured to generate multiple sets of data for testing the same feature, the data generation module 208 may be configured to generate one or more sets of data that satisfy the requirements of the specification file 222 and generate one or more sets of data that fail at least some of the requirements of the specification file 222, such that the scenario testing module 132 may test whether the backend services return the correct response (e.g., success or failure).

The data generation module 208 may then parse the specification file 222 to determine the data fields needed for performing the feature. In the example illustrated in FIG. 5, it is shown, in the parameters section 504 of the specification file 222, that the features of adding a new physical address requires a "user id" data field and an "address" data field. While the example illustrated in FIG. 5 shows only two data fields required for adding the physical address feature, in some other embodiments, more data fields may be specified in the specification file 222. For example, instead of having only one "address" data field, the specification file 222 may specify multiple data fields related to the address, such as a "street_address" field, a "city" field, a "state" field, a "zip_code" field, and a "country_code" field. Thus, the data generation module 208 may determine the data fields of "user id," "street_address," "city," "state," "zip_code," and "country_code" are needed for performing the feature. In some embodiments where the scenario file 232 does not specify any data for the data fields, the data generation module 208 may generate data for all of the fields from the specification file 222. On the other hand, when it is determined that the scenario file specify additional restrictions on one or more particular data fields (e.g., country_code is US, etc.), the data generation module 208 may use the data from the scenario file 232 for the particular data fields, and generate fictitious only for the other data fields not restricted by the scenario file 232.

Furthermore, the parameters section 504 of the specification file 222 may include requirements for each of the data fields (not shown in the figure). For example, the specification file 222 may specify that the "street_address" field may include alpha-numeric and special characters and may be limited to 20 characters, the "city" field may include alphabet characters and may be limited to 10 characters, the "state" field may include alphabet characters and may be limited to 10 characters, the "zip_code" field may include alpha-numeric characters and may be limited to 8 characters, and the "country_code" field may only include any country code listed in a predetermined listing of two alphabet country codes.

Thus, the data generation module 208 may determine a set of criteria for generating the test data corresponding to the data fields associated with the feature based on the requirements set forth in the specification file 222 and the scenario file 232. For example, the data generation module 208 may determine to use the account identifier obtained from creating the new business account for the "user id" field. Based on the third phrase of the scenario file 232, the data generation module 208 may determine to use "US" for the "country_code" data field. The data generation module 208 may then use the requirements set forth in the specification file 222 to form the set of criteria for the remaining data fields, such as the "street address" field, the "city" field, the "state" field, and the "zip_code" field. The data generation module 208 may then generate test data for these data fields such that the test data complies with the set of criteria.

In some embodiments, the data generation module 208 may dynamically generate test data for these data fields such that the data generation module 208 may generate different test data every time. For example, for each data field, the data generation module 208 may first determine (e.g., randomly) a length (e.g., a number of characters) of data for that data field within the character limit In one example, for the "street address" field, the data generation module 208 may determine (e.g., randomly) a number of characters (e.g., 13) less than the limit 20. For each of the 13 characters, the data generation module 208 may determine (e.g., randomly) a particular alpha-numeric or special character (including a space character). For the "zip_code" field, the data generation module 208 may again determine (e.g., randomly) a number of characters (e.g., 6) that is less than the limit 8. For each of the 6 characters, the data generation module 208 may then determine (e.g., randomly) a particular alpha-numeric character. The data generation module 208 may continue to generate test data for the other data fields associated with the feature in a similar manner. The data for these data fields are dynamically generated such that every time the data generation module 208 generates test data for these fields, the test data may be different than the test data generated from the previous time.

For example, the scenario file 232 may specify that a particular scenario is tested multiple times (e.g., 50 times). In this example, when the testing manager 202 determines that the particular scenario should be tested multiple times (e.g., by parsing the scenario file 232), the testing manager 202 may use the data generation module 208 to generate 50 sets of fictitious test data for the particular scenario (e.g., generating fictitious test data 50 times). Since the data generation module 208 generates the fictitious test data dynamically, the 50 sets of fictitious test data are likely to be different from each other (e.g., different lengths of characters in a data field and/or different characters in a data field, etc.). The testing manager may then perform the testing of the feature based on the same scenario 50 times, each with a different set of fictitious test data.

While the scenario file 232 in this example only specifies one use-case scenario, as discussed here, multiple use-case scenarios may be specified within a single scenario file. For example, instead of only specifying "US" for the "country_code" field, the scenario file 232 may specify multiple different use-case scenarios based on the same feature. In the example where the feature corresponds to adding an address to a user account, the scenario file 232 may specify multiple use-case scenarios for adding addresses of different countries by enumerating a list of country codes (e.g., "US," "MX," "CN," "JP," "BR," "GR," "CA," etc.) for the "country_code" field. Thus, when the testing manager 202 determines that multiple scenarios are specified in the scenario file 232 (e.g., an enumerated list of different variables for a particular data field is included in the scenario file), instead of generating one set of test data, the data generation module 208 may generate multiple sets of test data for the multiple scenarios specified in the scenario file 232. For example, when the multiple scenarios correspond to different country codes, the testing manager 202 may generate multiple sets of test data where each set of test data corresponds to one of the enumerated country codes, and where each set of test data includes dynamically generated data for all of the required data fields associated with the feature.

Once the test data is generated, the process 300 generates and executes (at step 330) function calls with a backend service to perform the feature based on the fictitious test data. For example, the testing module 202 may identify one or more backend services for testing the feature. In some embodiments, the scenario file 232 may specify which backend service for testing the feature. As such, the testing manager 202 may parse the scenario file 232 to determine the one or more backend services for testing the feature. In some embodiments, when no backend service is specified in the scenario file 232, the testing manager may determine all of the available backend services, such as the backend services 252 and 254 for testing the feature.

The testing manager 202 may use the calls generation module 210 to generate the function calls for performing the feature on the determined backend services 252 and 254. In some embodiments, the calls generation module 210 may store information related to the APIs associated with the available the backend services 252 and 254. For example, the calls generation module 210 may store information related to a first API that is associated with the backend service 252 and information related to a second API that is associated with the backend service 254. For each of the APIs, the calls generation module 210 may include a mapping between feature and function calls (and coding frameworks) corresponding to the API. As such, based on the feature determined from the scenario file 232, the calls generation module 210 may determine one or more function calls for performing the feature. In this example, the calls generation module 210 may determine first one or more function calls for performing the feature of adding a new physical address with the backend service 252 and second one or more function calls for adding a new physical address with the backend service 254. The first one or more function calls may then be implemented within a first coding framework specific to the backend service 252, and the second one or more function calls may be implemented within a second coding framework specific to the backend service 254.

The testing manager 202 may then execute the first one or more function calls with the backend service 252 based on the fictitious test data. For example, the testing manager 202 may incorporate the fictitious test data into the first one or more function calls (e.g., as parameters in the first one or more function calls) and may execute the first one or more function calls with the backend service 252. When it is determined that the scenario file 232 specifies multiple use-case scenarios and/or executing the same use-case scenario multiple times, and thus multiple sets of test data is generated by the data generation module 208, the testing manager 202 may execute the first one or more function calls with the backend service 252 multiple times, each time using a different set of test data.

The testing manager 202 may then execute the second one or more function calls with the backend service 254 based on the same fictitious test data used in the first one or more function calls. For example, the testing manager 202 may incorporate the fictitious test data into the second one or more function calls (e.g., as parameters in the second one or more function calls) and may execute the second one or more function calls with the backend service 254. Similar to executing the first one or more function calls, when it is determined that the scenario file 232 specifies multiple use-case scenarios and/or executing the same use-case scenario multiple times, and thus multiple sets of test data is generated by the data generation module 208, the testing manager 202 may execute the second one or more function calls with the backend service 254 multiple times, each time using a different set of test data.

In some embodiments, when multiple backend services are available for testing the feature, the framework may perform "mixed-mode" testing by testing the different backend services in the same feature test. To generate the "mixed-mode" testing, the calls generation module 210 of some embodiments may implement different function calls associated with the same feature using codes specifically for the different backend services. For example, to test a feature of performing a transaction using a newly added address, the calls generation module 210 may implement a first function call corresponding to adding a new address based on codes specifically for a first backend service, and may implement a second function call corresponding to performing a transaction using the newly added address based on codes specifically for a second backend service. The testing manager 202 may execute the first function call using the first backend service and may then execute the second function call using the second backend service for testing the feature.

The process 300 then validates (at step 335) a response from the backend service. Upon executing the first one or more function calls and the second one or more function calls, the test manager 202 may receive a response from each of the backend services 252 and 254. For example, the backend services 252 and 254 may perform actions (e.g., executing their corresponding software code) related to the feature based on the test data provided by the testing manager 202. The backend services 252 and 254 may then provide responses to the testing manager 202. Each of the responses received from the backend services 252 and 254 may indicate a result of performing the feature based on the corresponding set of test data. For example, a response may indicate that the performance of the feature (e.g., the operation of adding the new physical address based on the test data) is successful or has failed. In some embodiments, the response may also indicate a reason of the failure (e.g., in the form of an error code).

Thus, in some embodiments, the testing manager 202 may determine whether the responses received from the backend services 252 and 254 correspond to expected responses. In some embodiments, the scenario file 232 may indicate a valid (e.g., expected) response from performing the feature based on the scenario(s) covered in the scenario file 232. For example, referring back to FIG. 4, the fourth phrase (e.g., the last line) of the scenario file 232 begins with the keyword "Then," and specifies how the response from testing the feature should be validated. In this example, as indicated by the text that follows the keyword "Then," the scenario file 232 specifies that after performing the feature based on the scenario indicated in the scenario file 232, the creation of the address should return a successful response. As such, the testing manager 202 may validate the responses received from the backend services 252 and 254 by determining whether the responses indicate successful performances of the feature.

Not all testing of features is expected to receive a "successful" response. For example, the scenario file may cover a scenario for adding a physical address using test data that does not comply with one or more of the requirements specified in the corresponding specification file (e.g., exceeding a character limit requirement, using an unacceptable character, etc.), or the data generation module 208 may deliberately generate data that fails the requirement set forth in the specification file to test how the backend service(s) handle such a situation. In this example, the scenario file may indicate that a valid (e.g., expected) response would be a failure response. In particular, the scenario file may indicate a specific failure response (e.g., an error code corresponding to invalid address data, etc.). As such, the testing manager 202 may validate a response based on that scenario file (or based on a determination that the data generation module 208 has deliberately generated data that fails the requirement of the specification file) by determining whether the response corresponds to a failure response, and more particularly, corresponds to a response having the specific error code. The testing manager 202 may then present a report on the device 170 indicating whether the testing of the feature based on the scenario file 232 is successful (e.g., whether the responses received by executing the function calls correspond to the expected responses indicated in the scenario file 232).

The use of the framework to test features against backend services enables the users (e.g., the software developers) to easily manage test scenarios (e.g., use-case scenarios) and changes to the features and/or backend services. For example, a change of the backend services (e.g., an upgrade and/or migration from one backend service to another backend service) does not require the users to replicate test scenarios. Instead, an upgrade to the framework (e.g., incorporating the APIs of the new backend service in the scenario testing module 132) may be all that is required, and the same scenario files and specification files can be used for testing against the new backend service. Similarly, a change to a requirement of a data field requires only changes to one specification file, while the same scenario files can be used. Thus, the changes being made can be transparent to the users (e.g., software developers) who perform the testing of the features. Although the examples illustrated above describe testing features against one or more backend services, the feature testing method can also be used for testing features against other types of services (e.g., web services).

In some embodiments, the scenario testing module 132 may also provide an intuitive interface for creating and/or editing a scenario file based on one or more specification files. For example, a script editor 212 may be provided on the device 170 and work with the script editing module 204 for creating and/or editing a scenario file. The script editor 212 may include a text editor that enables a user of the device 170 to edit text for a scenario file. As discussed herein, a scenario file may conform to the particular syntactical structure associated with the framework (e.g., the scenario testing module 132). Thus, as the user of the device 170 inserts and/or edits text of a scenario file, the script editor 212 may predict a next word and either automatically fill-in the next word or provide a list of selectable word candidates for the user to choose as the next word.

As illustrated in FIG. 4 and discussed above, the particular syntactical structure may include multiple phrases, where each phrase begins with a particular keyword. As such, by detecting a beginning of a new phrase, the script editor 212 may automatically include the corresponding keyword of the subsequent phrase. For example, when it is detected that a cursor is located at the beginning of a first phrase (e.g., at the beginning of the file), the script editor 212 may automatically insert the keyword "Scenario:". When it is detected that the cursor is located at the beginning of the second phrase (e.g., detecting a carriage return input after the first phrase is inserted), the script editor 212 may automatically insert the keyword of the second phrase (e.g., "Given Do").

Furthermore, as discussed herein, specification files associated with different features may be provided to the scenario testing module 132. Each specification file may be associated with a feature and may indicate the requirements for the data fields (e.g., for input data) associated with the feature. As such, the scenario testing module 132 may parse the specification files (e.g., the specification files 222-228 stored in the database 220) to generate a list of features available (e.g., a list of operation identifiers indicated in the specification files) and a list of data fields that are associated with each feature. When a keyword associated with inserting an operation identifier is detected (e.g., the keyword "Given Do"), the script editing module 204 may cause the interface provided by the script editor 212 to present the list of operation identifiers obtained from the specification files as selectable options that enable the software developer to select any one of the operation identifiers to be inserted into the scenario file. When a keyword associated with inserting a data parameter is detected (e.g., the keyword "parameter"), based on the operation identifier indicated in the scenario file, the script editing module 204 may cause the interface provided by the script editor 212 to present the list of data fields associated with the operation identifier as selectable options that enable the software developer to select any one of the data fields to be inserted into the scenario file. This way, the user of the script editor 212 may generate scenario files without reading through the specification files and remembering all of the syntaxes associated with the particular syntactical structure.

Figure 6:
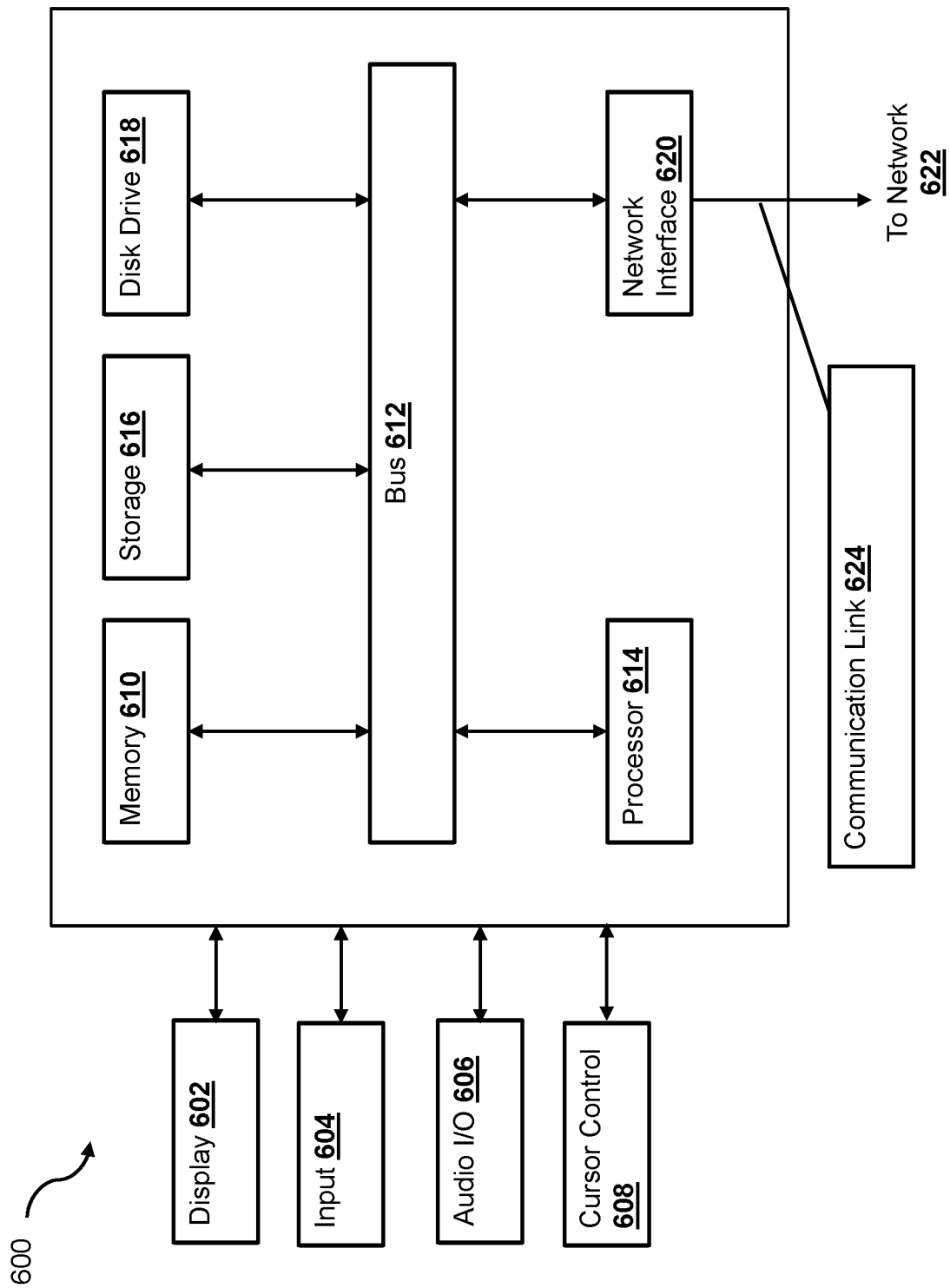
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the user device 110, and the device 170. In various implementations, the user device 110 and/or the device 170 may include a mobile cellular phone, personal computer (PC), laptop, wearable computing device, etc. adapted for wireless communication, and the service provider server 130 may include a network computing device, such as a server. Thus, it should be appreciated that the devices 110, 170, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account, a checkout page for purchasing an item from a merchant, or a chat interface for facilitating an online chat session. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the use-case scenario testing functionalities described herein according to the process 300.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
   determining, by one or more hardware processors, a use-case scenario for testing an electronic service based on a scenario file;
   dynamically generating, by the one or more hardware processors, test data for the use-case scenario for testing the electronic service, wherein the test data corresponds to a set of data parameters associated with the electronic service and is generated to satisfy a set of criteria associated with the set of data parameters;

determining, by the one or more hardware processors, a plurality of functions associated with testing the electronic service based on the use-case scenario;

generating, by the one or more hardware processors, a first function call for executing a first function from the plurality of functions on a first backend system, wherein the first function is associated with adding a portion of the generated test data to a database of the electronic service;

generating, by the one or more hardware processors, a second function call for executing a second function from the plurality of functions on a second backend system, wherein the second function is associated with accessing a service of the electronic service based on the portion of the generated test data stored in the database;

executing, by the one or more hardware processors, the first function call on the first backend system to add the portion of the generated test data to the database;

receiving, by the one or more hardware processors, a first response from the first backend system;

in response to receiving the first response, executing, by the one or more hardware processors, the second function call on the second backend system to access the service based on the portion of the generated test data stored in the database; and validating a second response received from the second backend system.

2. The method of claim 1, further comprising:

determining that the scenario file specifies testing the electronic service based on the use-case scenario a number of times, wherein the dynamically generating the test data comprises generating sets of fictitious data corresponding to the number based on the use-case scenario, and wherein each set of fictitious data is different from other sets in the sets of fictitious data.

3. The method of claim 2, wherein the first function call and the second function call are executed the number of times, and wherein each execution of the first and second function calls are based on a different set of fictitious data in the sets of fictitious data.

4. The method of claim 1, wherein the set of criteria is determined based at least in part on a data specification file associated with the electronic service.

5. The method of claim 4, wherein the data specification file further indicates a first valid response based on the first function call, and wherein the method further comprises determining that the first response received from the first backend system corresponds to the first valid response indicated in the data specification file.

6. The method of claim 1, wherein the dynamically generating the test data comprises generating different sets of fictitious data for the use-case scenario based on different criteria associated with the use-case scenario.

7. A system, comprising:

a non-transitory memory storing instructions; and one or more hardware processors coupled with the non-transitory memory and configured to read the instructions from the non-transitory memory to cause the system to perform operations comprising:

determining a test scenario for testing an online software application based on a scenario file, wherein the scenario file is backend services agnostic;

generating test data for the test scenario based on the scenario file and specifications associated with a set of data variables;

determining a plurality of functions associated with testing the online software application based on the test scenario;

generating a first application programming interface (API) function call for executing a first function from the plurality of functions on a first backend service that implements the online software application, wherein the first function is associated with adding a portion of the generated test data to a database of the online software application;

generating a second API function call for executing a second function from the plurality of functions on a second backend service that implements the online software application, wherein the second function is associated with accessing a service of the online software application based on the portion of the generated test data stored in the database;

executing the first API function call on the first backend service to add the portion of the generated test data to the database;

receiving a first response from the first backend service;

in response to receiving the first response, executing the second API function call on the second backend service to access the service based on the portion of the generated test data stored in the database; and validating a second response received from the second backend service.

8. The system of claim 7, wherein the scenario file specifies a criterion corresponding to one of the set of data variables that is narrower than the specifications associated with the set of data variables.

9. The system of claim 8, wherein the test data is generated to satisfy both the criterion specified in the scenario file and the specifications.

10. The system of claim 7, wherein the operations further comprise:

determining a first valid response for the first API function call based on the first portion of the generated test data; and validating the first response based on the first valid response.

11. The system of claim 7, wherein the generating the test data comprises dynamically generating different sets of fictitious data for testing the online software application based on the test scenario, wherein the different sets of fictitious data are generated based on different criteria associated with the test scenario.

12. The system of claim 11, wherein the different criteria specify different values corresponding to a particular data variable in the set of data variables, and wherein the test data is generated further based on the values specified by the different criteria.

13. The system of claim 7, wherein the executing the second API function call on the second backend service causes the second backend service to perform a transaction using the portion of the generated test data.

14. The system of claim 7, wherein the scenario file includes a parameter that indicates that the test scenario is for execution on the first and second backend services among a plurality of backend services, and wherein the first and second API function calls are generated based on the parameter.

15. The system of claim 7, wherein the operations further comprise:

providing a text-editing interface for generating the scenario file;

upon detecting an operation keyword received on the text-editing interface, searching through a specification file associated with the online software application to retrieve a set of data parameters; and providing the set of data parameters as selectable options to be automatically inserted into the text-editing interface.

16. A non-transitory machine-readable medium having stored thereon machine-readable instructions executable to cause a machine to perform operations comprising:

determining a test scenario for testing an online software application based on a scenario file received from a computing device, the scenario file being backend services agnostic generating test data for the test scenario based on the scenario file and specifications associated with a set of data variables;

determining a plurality of functions associated with testing the online software application based on the test scenario;

generating a first function call for executing a first function from the plurality of functions on a first backend service that implements the online software application, wherein the first function is associated with adding a portion of the generated test data to a database of the online software application;

generating a second function call for executing a second function from the plurality of functions on a second backend service that implements the online software application, wherein the second function is associated with accessing a service of the online software application based on the portion of the generated test data stored in the database;

executing the first function call on the first backend service to add the portion of the generated test data to the database;

receiving a first response from the first backend service;

in response to receiving the first response, executing the second function call on the second backend service to access the service based on the portion of the generated test data stored in the database; and validating a second response received from the second backend service.

17. The non-transitory machine-readable medium of claim 16, wherein the scenario file specifies a criterion corresponding to one of the set of data variables that is stricter than the specifications associated with the one of the set of data variables.

18. The non-transitory machine-readable medium of claim 17, wherein the test data is generated to satisfy both the criterion specified in the scenario file and the specifications.

19. The non-transitory machine-readable medium of claim 16, wherein the operations further comprise: determining a first valid response for the first function call based on the first portion of the generated test data and validating the first response based on the first valid response.

20. The non-transitory machine-readable medium of claim 16, wherein the generating the test data comprises dynamically generating different sets of fictitious data for the test scenario based on different criteria associated with the test scenario.

* * * * *